(12) United States Patent
Uwano et al.

(10) Patent No.: US 6,263,406 B1
(45) Date of Patent: Jul. 17, 2001

(54) PARALLEL PROCESSOR SYNCHRONIZATION AND COHERENCY CONTROL METHOD AND SYSTEM

(75) Inventors: Kohki Uwano; Shigeko Hashimoto; Naonobu Sukegawa; Tadaaki Isobe; Miki Miyaki; Tatsuya Ichiki, all of Hadano (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/153,872

(22) Filed: Sep. 16, 1998

(30) Foreign Application Priority Data

Sep. 16, 1997 (JP) .................................................. 9-250621

(51) Int. Cl.[7] .................................................. G06F 13/00
(52) U.S. Cl. .................. 711/141; 711/121; 711/124; 712/29
(58) Field of Search .................... 711/119, 120, 711/121, 124, 141, 146; 712/28, 29, 30, 203; 709/400

(56) References Cited

U.S. PATENT DOCUMENTS

| | | | |
|---|---|---|---|
| 5,887,138 | * 3/1999 | Hagersten et al. | ................ 709/215 |
| 5,958,019 | * 9/1999 | Hagersten et al. | ................ 709/400 |
| 5,968,135 | * 10/1999 | Teramoto et al. | ................ 709/400 |
| 5,978,874 | * 11/1999 | Singhal et al. | ................ 710/107 |
| 6,038,651 | * 3/2000 | VanHuben et al. | ................ 712/21 |

* cited by examiner

Primary Examiner—Do Hyun Yoo
Assistant Examiner—Gary J. Portka
(74) Attorney, Agent, or Firm—Antonelli, Terry, Stout & Kraus, LLP

(57) ABSTRACT

Each of processors in a multiprocessor system has a circuit for sending a synchronizing signal to a storage controller (SC) connected thereto when executing a synchronization instruction such as a start, end or barrier synchronization instruction. Each of the SCs has a circuit for notifying the corresponding processor of establishment of a synchronization upon detection of completion of a check to be made by an address management table FAA and of the issuing of necessary cache cancel requests corresponding to a store instruction issued before the synchronization instruction and upon recognition of the fact that all the processors have sent their synchronizing signals and that the issuing of all the cache cancel requests have been complete.

18 Claims, 14 Drawing Sheets

PARALLEL PROCESSOR SYNCHRONIZATION AND COHERENCY CONTROL METHOD AND SYSTEM

BACKGROUND OF THE INVENTION

The present invention relates to parallel processor systems in which a plurality of processors share a storage in common. More particularly, the present invention is directed to a parallel processor control method and system suited for synchronization control among processors that is based on interdependence between data in caches and data in the storage.

Synchronization control among a plurality of processors in a storage-shared parallel processor system includes start synchronization control that assures simultaneous start of all the processors, end synchronization control that assures the end of a process executed by each processor, and barrier synchronization control that assures storage access sequencing among the processors. Each processor has a cache for storing data copied from the storage, and when the processors process data on which they are dependent among themselves, the system must effect the start, end and barrier synchronization controls, considering coherency between the caches and storage (cache coherency).

How start, end and barrier synchronization instructions are processed serially in parallel data processing while maintaining coherency between cache data and storage data is the problem to be solved in improving parallel processing performance.

SUMMARY OF THE INVENTION

An object of the present invention is to provide a parallel processor control method and system capable of assuring coherency between cache data and storage data by adjusting correspondence between the cache data and the storage data in executing synchronization instructions including start and end synchronization instructions or in executing a barrier synchronization instruction.

Another object of the present invention is to provide a high-speed cache synchronization mechanism by which storage controllers do not need to wait for cache entry cancel completion that assures coherency between cache data and storage data.

Still another object of the present invention is to provide a parallel processor control method and system capable of assuring high-speed cache-storage coherency by causing storage controllers to assure coherency between cache data and storage data using synchronization instructions including start and end synchronization instructions or using a barrier synchronization instruction.

Still another object of the present invention is to provide a parallel processor system capable of implementing hardware that treats a main processor and subprocessors equally by effecting start, end and barrier synchronizations using a single circuit and by assuring on a software basis that the main processor and the subprocessors perform the same operation.

Still another object of the present invention is to provide a parallel processor system capable of anticipating the start of a process using the data that is present in both caches and the storage by adding a synchronization interface bypassing cache-storage coherency assurance.

Still another object of the present invention is to provide a parallel processor system capable of implementing high-speed parallel processing by detecting a case where the absence of data dependence can be dynamically determined, effecting, upon detection of such a case, barrier synchronization independently of the completion of cache coherency control that assures cache-storage coherency, and thereby saving wait time.

Still another object of the present invention is to provide a parallel processor system capable of implementing high-speed parallel processing by detecting a case where the absence of data dependence can be dynamically determined, establishing, upon detection of such a case, a barrier synchronization independently of the completion of cache coherency control that assures cache-storage coherency, and thereby saving unnecessary wait time.

The present invention provides an apparatus for controlling parallel processors comprising:

a storage;

a plurality of processors respectively having caches and commonly sharing the storage; and a plurality of storage controllers respectively connected to the plurality of processors, wherein one of the plurality of processors has a start circuit for sending a start signal to the storage controller connected to the one processor when the one processor has executed a start instruction to the rest of the processors;

the storage controller connected to the one processor has a first assurance circuit for detecting completion of the sending of cache data cancel signals corresponding to a store instruction issued by the one processor before the start instruction and for notifying the storage controllers connected to the rest of the processors of the detection; and the storage controllers connected to the rest of the processors have second assurance circuits for sending start instructions to the rest of the processors when the second assurance circuits detect completion of the issuing of cache cancel requests to the rest of the processors in response to the notification from the storage controller connected to the one processor.

It is possible to add an address management table for holding storage address information for data held in the caches; and a cancel issuance circuit, connected to the first assurance circuit and the second assurance circuits for issuing said cache data cancel signals corresponding to a store instruction issued by the one processor by referencing the address management table. The rest of the processors stop processing subsequent instructions until the rest of the processors receive the start instructions. Further, the rest of the processors have end origination circuits for sending end signals to the storage controllers connected to the rest of the processors when the rest of the processors have executed end instructions each indicating that a process has ended; and the storage controllers connected to the rest of the processors have circuits for detecting completion of the sending to the one processor of cache data cancel signals corresponding to a store instruction issued before the end instructions.

In another aspect of the present invention, it is possible to provide a storage-shared parallel processor system having a plurality of processors respectively having caches, a plurality of storage controllers (SC) respectively connected to the plurality of processors, a storage shared in common by the plurality of processors, and an address management table or front address array (FAA) for providing a centralized management of storage address information for data held in the caches of all the processors, wherein the parallel processor system comprises, to implement high-speed synchronization interface, a start interface including cache-storage coherency assurance. The start interface comprises: a circuit for causing a main processor to set a start register and send a start signal to an SC connected to the main processor when the main processor has decoded an instruction (start instruction) for starting subprocessors; a circuit for causing the SC connected to the main processor and having received the start signal to detect completion of an FAA check and of the issuing of a necessary cache cancel request corresponding to a store instruction issued before the start instruction and to notify the SCs connected to all the subprocessors of the detection; and a circuit for causing an SC connected to each subprocessor having received the notification to start the subprocessor connected to the SC when the SC has detected the issuing to the processor of all the cache cancel requests issued from the main processor to the subprocessor before the start instruction.

Further, the parallel processor system of the present invention comprises an end interface including cache-storage coherency assurance. The end interface comprises: a circuit for causing each subprocessor to set an end register and send an end signal to the SC connected to each subprocessor when each subprocessor has decoded an instruction (end instruction) indicating that an internal process has ended; a circuit for causing the SC connected to each subprocessor and having received the end signal to detect completion of an FAA check and the issuing of a necessary cache cancel request corresponding to a store instruction issued before the end instruction; a circuit for, when the SCs connected to all the subprocessors have detected completion of the FAA check and of the issuing of the necessary cache cancel request corresponding to the store instruction, notifying the SC connected to the main processor of the detection; and a circuit for causing the SC connected to the main processor and having received the notification to notify the main processor of an end when the SC connected to the main processor has detected the issuing to the processor of all the cache cancel requests issued from each subprocessor to the main processor before the end instruction.

Further, the parallel processor system of the present invention comprises a synchronization interface including cache-storage coherency assurance. The synchronization interface comprises: a circuit for causing each processor to set a barrier synchronization register and send a barrier-synchronizing signal to the SC connected to each processor when each processor has decoded an instruction (barrier synchronization instruction) for synchronizing all the processors to assure sequencing according to which all the processors access the same address of the storage; a circuit for causing each SC having received the barrier-synchronizing signal to detect completion of an FAA check and of the issuing of a necessary cache cancel request corresponding to a store instruction issued before the barrier synchronization instruction; a circuit for, when all the SCs have detected completion of the FAA check and of the issuing of the necessary cache cancel request corresponding to the store instruction, notifying each SC of the detection; and a circuit for notifying the processor connected to each SC and having received the notification of establishment of a barrier synchronization when each SC has recognized that all the SCs completed the FAA check and the issuing of the cache cancel requests and when each SC has issued all the accepted cache cancel requests to the processor.

Further, the parallel processor system of the present invention allows start and end operations to be performed with the same circuit as; a barrier synchronization operation, so that no special hardware is provided for the main processor and the subprocessors in performing these operations. That is, for the start operation, the main processor gives a start notification and so does each subprocessor, while for the end operation, each subprocessor gives an end notification and so does the main processor.

Further, the parallel processor system of the present invention uses a synchronization interface including cache-storage coherency assurance and a synchronization interface not including cache-storage coherency assurance, so that a process not requiring cache-storage coherency assurance can precede the establishment of a synchronization based on cache-storage coherency assurance.

Further, the parallel processor system of the present invention comprises, within a main processor, a cache coherency control execution determination section for determining whether or not completion of cache coherency control corresponding to a store instruction issued before a barrier synchronization instruction is related to establishment of a barrier synchronization and for holding determined results, and effects barrier synchronization control with or without dynamic cache coherency control completion assurance based on the determined results obtained from the cache coherency control execution determination section.

Further, the cache coherency control execution determination section has a cache coherency control execution determination cue for holding determined results corresponding to a plurality of barrier synchronization instructions, holds in the cache coherency control execution determination cue the determined results obtained from cache coherency control execution determinations corresponding to the plurality of barrier synchronization instructions made in advance, and effects barrier synchronization control using the determined results held in the cache coherency control execution determination cue during execution of the barrier synchronization instructions.

Further, when a barrier synchronization instruction is to be executed without cache coherency control execution determination, an output of the cache coherency control execution determination section is fixed to a value indicating that cache coherency control is required, so that a barrier synchronization instruction that assures completion of cache coherency control can be effected without fail.

BRIEF DESCRIPTION OF THE DRAWINGS

FIG. 11 is a diagram showing an exemplary instruction array for explaining the barrier synchronization control according to the present invention shown in FIG. 8;

FIG. 13 is a diagram showing another exemplary instruction array for explaining the barrier synchronization control according to the invention shown in FIG. 8.

DETAILED DESCRIPTION OF THE PREFERRED EMBODIMENTS

Embodiments of the present invention will now be described in detail.

<Embodiment 1>

Figure 1:
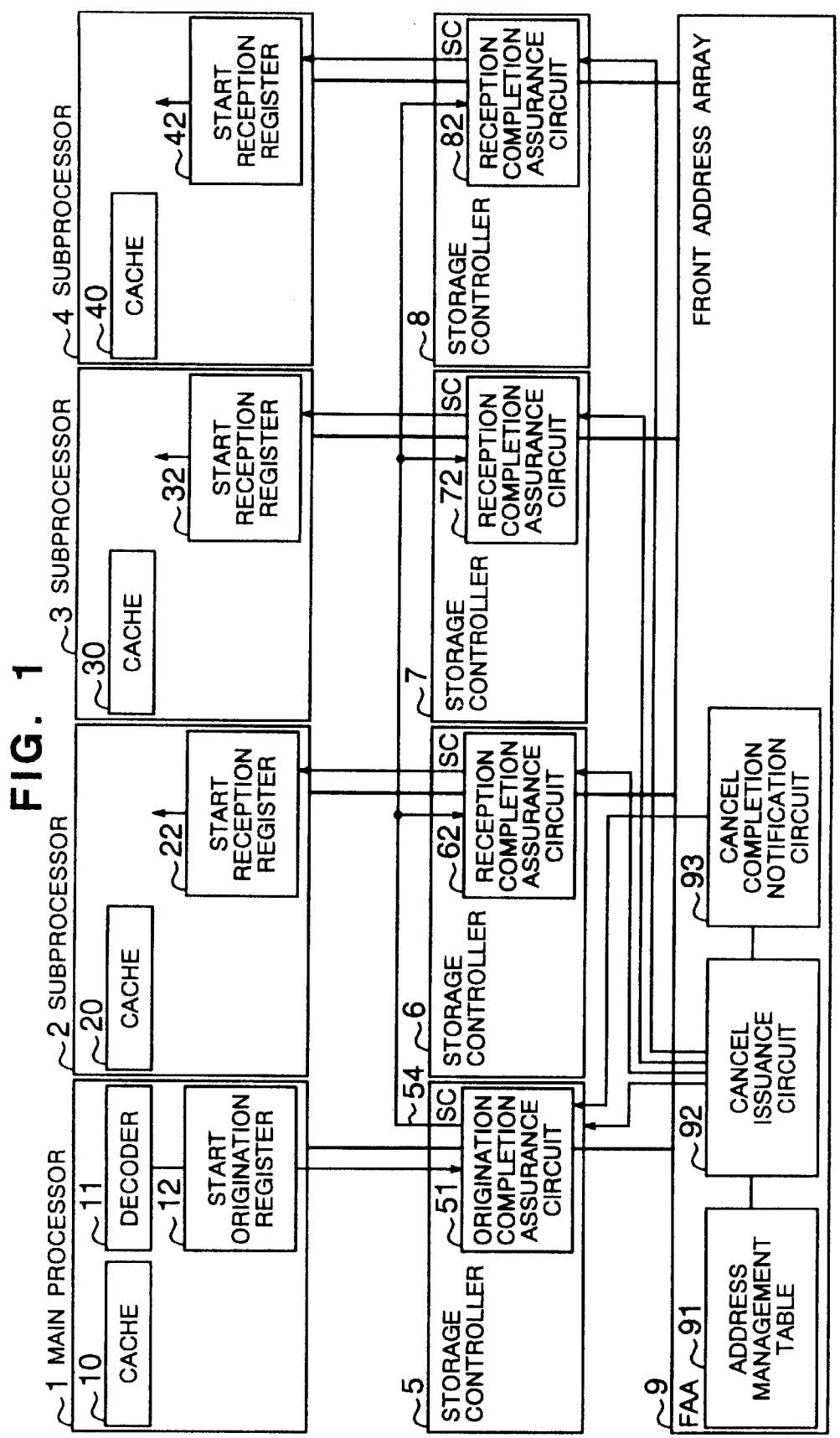
FIG. 1 is a block diagram showing an exemplary structure of a start interface of the present invention.
Figure 2:
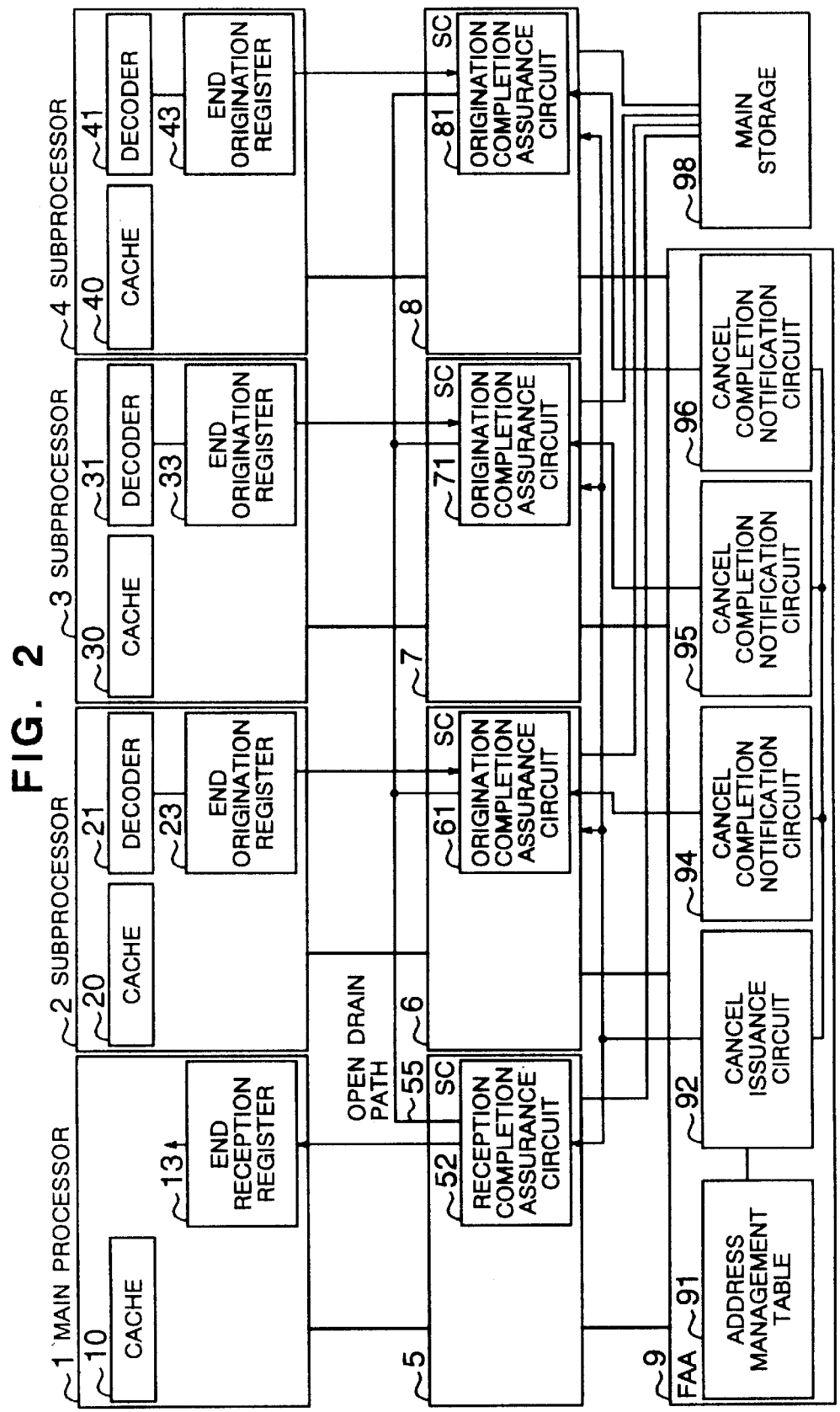
FIG. 2 is a block diagram showing an exemplary structure of an end interface of the present invention.
Figure 3:
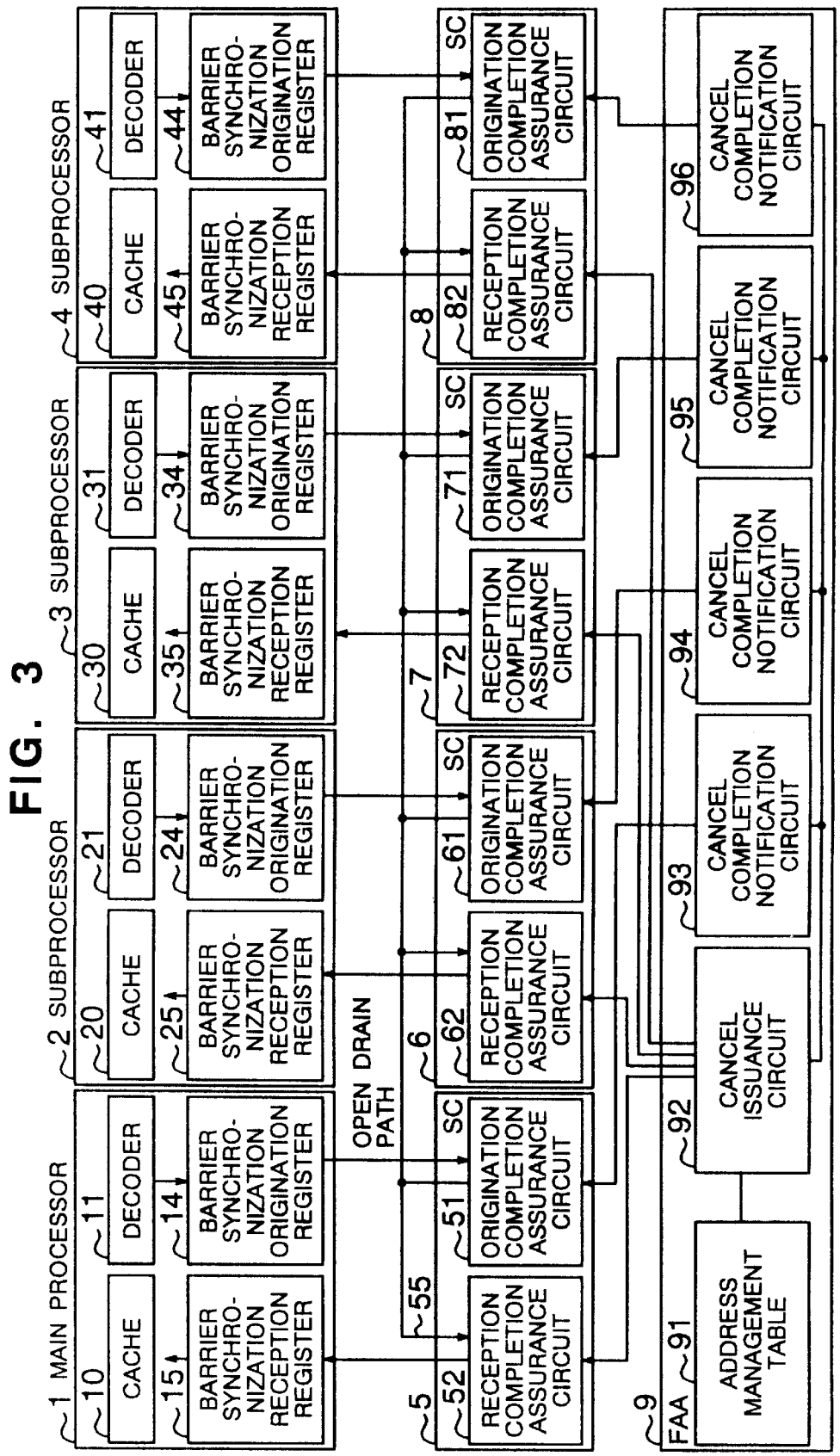
FIG. 3 is a block diagram showing an exemplary structure of a barrier synchronization interface of the present invention.

FIG. 1 is a block diagram showing a structure of a start interface; FIG. 2 is a block diagram showing a structure of an end interface; and FIG. 3 is a block diagram showing a structure of a barrier synchronization interface, all according to this embodiment. It may be noted that a storage that is commonly connected to storage controllers (SC) 5 to 8 is omitted in FIGS. 1 to 3 for convenience.

In FIGS. 1 to 3, a main processor 1 sets a start origination register 12 when a decoder 11 decodes a start instruction, and sets a barrier synchronization start register 14 when the decoder 11 decodes a barrier synchronization instruction. The processor 1 also sets an end reception register 13 upon end of processes executed by subprocessors 2 to 4. The processor 1 further sets a barrier synchronization reception register 15 upon establishment of a barrier synchronization. The subprocessors 2 to 4 set end origination registers 23, 33 and 43 when decoders 21, 31 and 41 decode end instructions, and set barrier synchronization origination registers 24, 34 and 44 when the decoders 21, 31 and 41 decode barrier synchronization instructions. The subprocessors 2 to 4 also set start reception registers 22, 32 and 42 when activated by the main processor 1, and set barrier synchronization reception registers 25, 35 and 45 when barrier-synchronized with one another. A start instruction and an end instruction are paired, and are prefixed and suffixed to a series of instructions which are to be executed in synchronism by a plurality of processors in a multiprocessor system. A barrier synchronization instruction is prefixed to an instruction that requires a plurality of processors to synchronize with one another at a predetermined timing.

A front address array or an address management table controller (FAA) 9 has an address management table 91 and provides a centralized management of storage address information for the data held in caches 10 to 40 of all the processors 1 to 4. A cancel issuance circuit 92 references the address management table 91 in response to a request for storing data into the storage (store request), and issues cache cancel requests to the SCs 5 to 8 if necessary. Each of cancel completion notification circuits 93 to 96 monitors the cancel issuance circuit 92, detects completion of the issuing of cache cancel requests to the other processors when its own processor (the processor connected to the concerned cancel completion notification circuit) makes a store request, and notifies the SCs 5 to 8 of the completion. The apparatus of the present embodiment can have a structure for processing start and end instructions shown in FIGS. 1 and 2 and/or a structure for processing a barrier synchronization instruction shown in FIG. 3, and FIGS. 1 to 3 are so prepared that the functions performed by these components can be understood separately.

The SCs 5 to 8 have origination completion assurance circuits 51, 61, 71 and 81 and reception completion assurance circuits 52, 62, 72 and 82. The origination completion assurance circuits 51, 61, 71 and 81 assure that the FAA 9 has sent to the SCs 5 to 8 cache cancel requests to the other processors when their own processor makes a store request, while the reception completion assurance circuits 52, 62, 72 and 82 assure that the SCs 5 to 8 have sent the cache cancel requests to the corresponding processors 1 to 4. An open drain path 55 ANDs the origination completion notifications from the origination completion assurance circuits 51, 61, 71 and 81, and reports the results to the reception completion assurance circuits 52, 62, 72 and 82. Another type of path not using an open drain-based wired-OR connection can, of course, be used.

Figure 4:
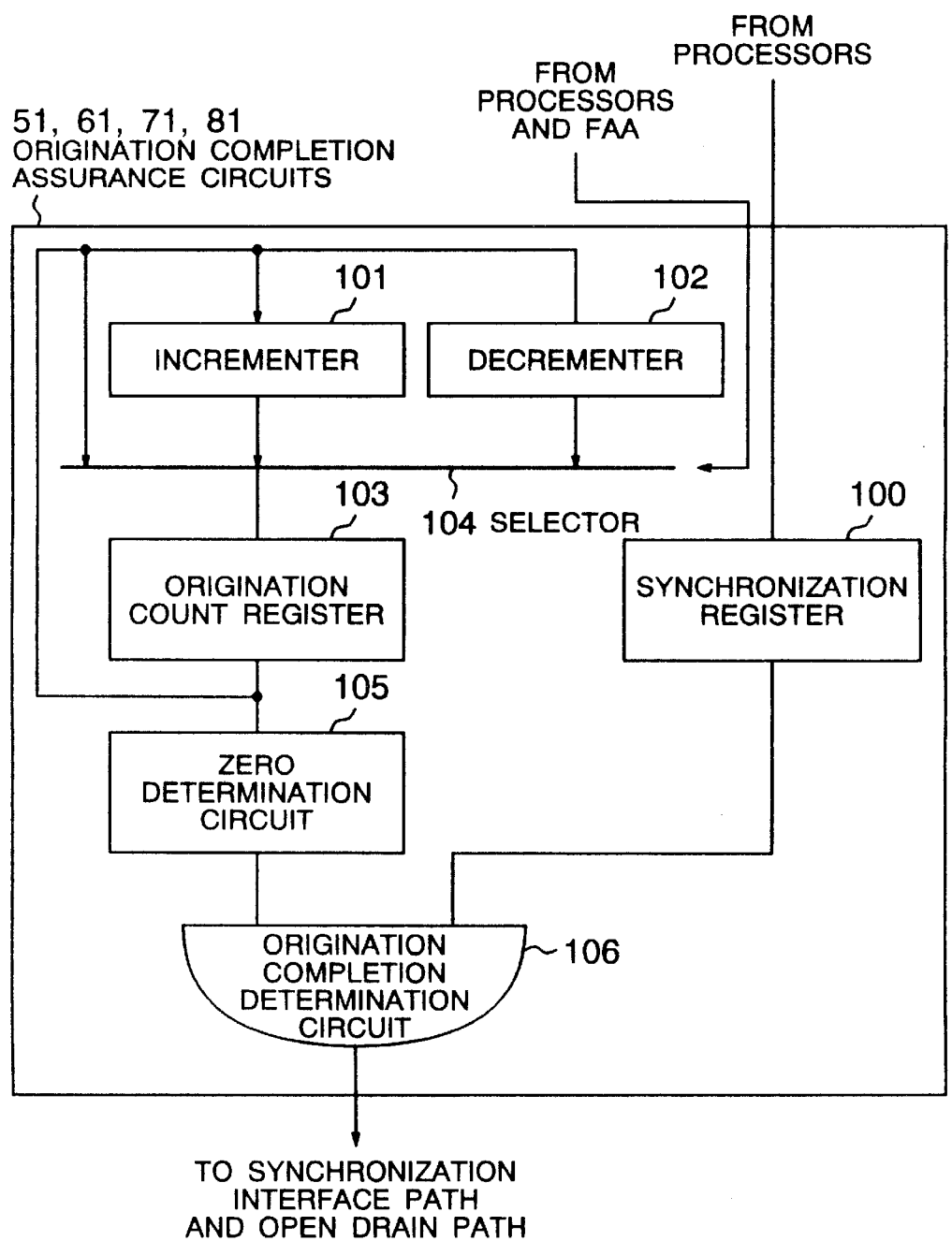
FIG. 4 is a block diagram showing an exemplary structure of an origination completion assurance circuit of the present invention.

FIG. 4 is a block diagram showing a specific structure of each of the origination completion assurance circuits 51, 61, 71 and 81 of the SCs 5 to 8. In FIG. 4, a synchronization register 100 indicates that its own processor has decoded a synchronization instruction (for start, end, or barrier synchronization). A selector 104 selects a value incremented by an incrementer 101 when its own processor issues a store request, a value decremented by a decrementer 102 when its own SC receives a cancel completion notification from the FAA 9, and otherwise selects an existing value. An origination count register 103 holds the selected value. A zero determination circuit 105 determines that the origination count register 103 is reset to "0." An origination completion determination circuit 106 determines that the synchronization register 100 is set and that the origination count register 103 is reset to "0."

Figure 5:
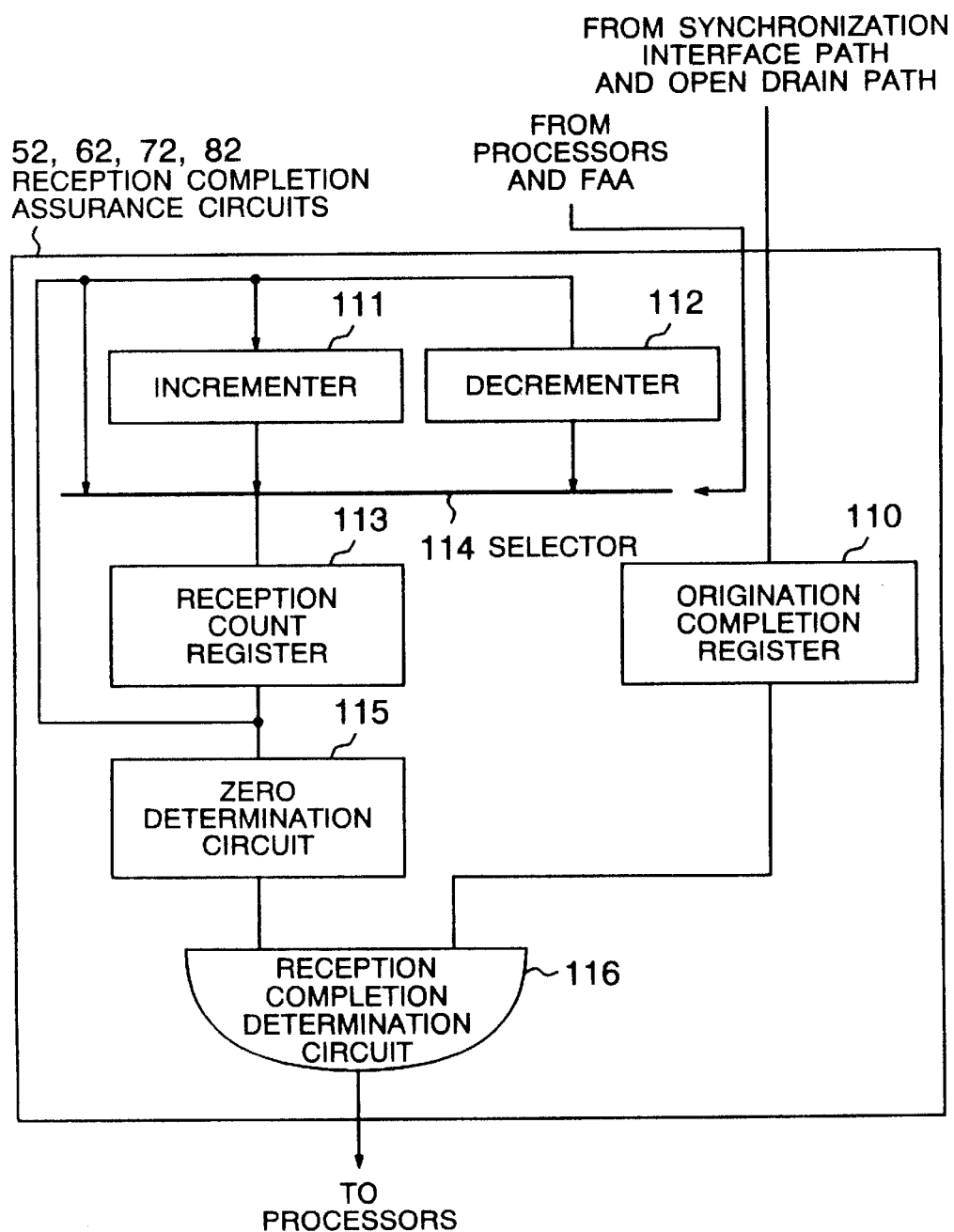
FIG. 5 is a block diagram showing an exemplary structure of a reception completion assurance circuit of the present invention.

FIG. 5 is a block diagram showing a specific structure of each of the reception completion assurance circuits 52, 62, 72 and 82 of the SCs 5 to 8. In FIG. 5, an origination completion register 110 indicates that origination completion assurance has been complete. A selector 114 selects a value incremented by an incrementer 111 when the FAA 9 has sent a cancel request to its own SC, a value decremented by a decrementer 112 when its own SC has sent the cancel request to its own processor, and otherwise selects an existing value. A reception count register 113 holds the selected value. A zero determination circuit 115 determines that the reception count register 113 is reset to "0." A reception completion determination circuit 116 determines that the origination completion register 110 is set and that the reception count register 113 is reset to "0."

First, the operation of a start process will be described with reference to the structure shown in FIG. 1. A timing chart for this operation is shown in FIG. 9.

Upon decoding of a start instruction in a program, the main processor 1 sets its start origination register 12. The output signal of the register 12 is sent to the origination completion assurance circuit 51 within the SC 5 (Step 230) to cause the circuit 51 to set its synchronization register 100. Since the origination completion assurance circuit 51 has incremented its origination count register 103 every time the main processor 1 issues a store request, the origination count register 103 holds as many store requests as store instructions in the program by counting the store requests issued before the decoded start instruction (Step 201). When the SC 5 sends a store request referencing request to the FAA 9 (Step 202) and when the cancel completion notification circuit 93 of the FAA 9 notifies the SC 5 that the issuing of cache cancel requests corresponding to a store request issued by the main processor 1 has been complete, the SC 5 decrements its origination count register 103. When the origination count register 103 is reset to "0," a which means that all the cache cancel requests corresponding to the issued store requests have been issued (Step 203), the zero determination circuit 115 is caused to determine this state. When the origination completion assurance circuit 51 of the SC 5 receives a start process notification from the main processor 1 and determines that all the cache cancel requests have been issued through its origination completion determination circuit 106, the origination completion assurance circuit 51 notifies such results, via a path (synchronization interface path) 54, to the reception completion assurance circuits 62, 72 and 82 of the SCs 6 to 8 connected to the subprocessors 2 to 4 (Step 231), and causes the circuits 62, 72 and 82 to set their origination completion registers 110. Since these reception completion assurance circuits 62, 72 and 82 increment their reception count registers 113 every time the cancel issuance circuit 92 of the FAA 9 issues a cache cancel request to the SCs 6 to 8, the reception count registers 113 have already been incremented when their origination completion registers 110 are set. Therefore, after the registers 110 are set, the reception completion assurance circuits 62, 72 and 82 decrement their reception count registers 113 every time the circuits 62, 72 and 82 send the received cancel request to their own subprocessors 2 to 4. When the reception count registers 113 are reset to "0," which means that all the cache cancel requests have been issued to the subprocessors (Step 204), the reception completion assurance circuits 62, 72 and 82 cause their zero determination circuits 115 to determine this state. When the circuits 62, 72 and 82 of the SC 6 to 8 receive origination completion notifications from the origination completion assurance circuit 51 of the SC 5 and determine that the cache cancel requests have been issued to all the subprocessors 2 to 4 through their origination completion determination circuits 116, the reception completion assurance circuits 62, 72 and 82 give start notifications to their subprocessors 2 to 4 (Step 232), and cause the subprocessors 2 to 4 to set their start reception registers 22, 32 and 42 (Step 233). The subprocessors 2 to 4 start given processes through the operation of not shown known circuits when their start reception registers 22, 32 and 42 are set.

Figure 9:
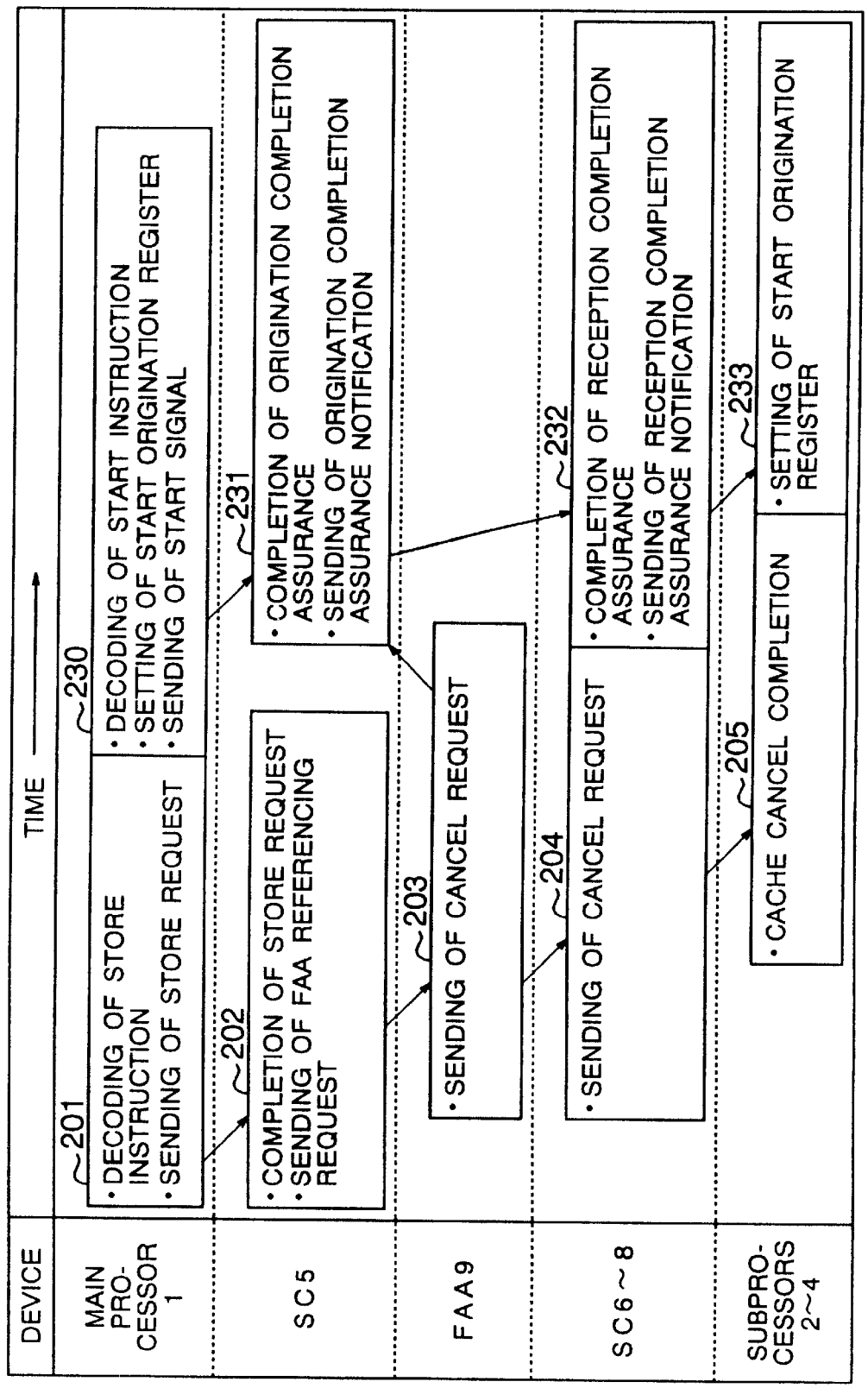
FIG. 9 is a timing chart of a start process according to the present invention shown in FIG. 1.

As is apparent from the timing chart shown in FIG. 9 previously referred to, the feature of this embodiment is to implement high-speed synchronization control including cache-storage coherency assurance by causing the SCs to assure coherency between the caches and the storage for a start instruction, thereby setting the start reception registers within the subprocessors.

Then, the operation of an end process will be described with reference to the structure shown in FIG. 2. Upon decoding of end instructions, the subprocessors 2 to 4 set their end origination registers 23, 33 and 43. The output signals of the end origination registers 23, 33 and 43 are sent to the corresponding origination completion assurance circuits 61, 71 and 81 to cause the circuits 61, 71 and 81 to set their synchronization registers 100. Since the origination completion assurance circuits 61, 71 and 81 have incremented their origination count registers 103 every time the subprocessors 2 to 4 issue a store request, the origination count registers 103 have already been incremented by counting the store requests issued before the decoded end instructions. Therefore, the origination completion assurance circuits 61, 71 and 81 decrement their origination count registers 103 every time the cancel completion notification circuits 94 to 96 of the FAA 9 give the circuits 61, 71 and 81 a cache cancel issuance completion notification corresponding to the issued store request. When the origination count registers 103 are reset to "0," which means that all the cache cancel requests corresponding to the issued store requests have been issued, the circuits 61, 71 and 81 cause their zero determination circuits 115 to determine this state. When the origination completion assurance circuits 61, 71 and 81 of the SCs 6 to 8 receive process end notifications from the corresponding subprocessors 2 to 4 and determine that all the cache cancel requests have been issued through their origination completion determination circuits 106, the origination completion assurance circuits 61, 71 and 81 send origination completion notification signals to the open drain path 55 that extends over the SCs. The open drain path 55 turns on upon reception of the origination completion notification signals from all the SCs 6 to 8 connected to the subprocessors 2 to 4, gives a notification to the origination completion assurance circuit 52 of the SC 5 connected to the main processor 1, and causes the circuit 52 to set its origination completion register 110. Since the reception completion assurance circuit 52 has incremented its reception count register 113 every time the cancel issuance circuit 92 of the FAA 9 issues a cache cancel request to the SC 5, the reception count register 113 already holds a count of store requests when its origination completion register 110 is set. Therefore, after the register 110 is set, the reception completion assurance circuit 52 decrements its reception count register 113 every time the received cache cancel request is sent to the processor 1. When the reception count register 113 is reset to "0," which means that all the cache cancel requests have been issued to the processor 1, the circuit 52 causes its zero determination circuit 115 to determine this state. When the reception completion assurance circuit 52 of the SC 5 receives origination completion notifications from the SCs 6 to 8 and determine that all the cache cancel requests have been issued to the main processor 1 through its reception completion determination circuit 116, the circuit 52 gives an end notification to the main processor 1, and causes the processor 1 to set its end reception register 13. The main processor 1 starts a next process through the operation of a not shown known circuit when its end reception register 13 is set.

Then, a barrier synchronization operation will be described with reference to the structure shown in FIG. 3. Upon decoding of barrier synchronization instructions, the processors 1 to 4 set their barrier synchronization origination registers 14, 24, 34 and 44. The output signals of these barrier synchronization origination registers 14, 24, 34 and 44 are sent to the corresponding origination completion assurance circuits 51, 61, 71 and 81 within the SCs 5 to 8 to cause the circuits 51, 61, 71 and 81 to set their synchronization resisters 100 shown in FIG. 4. The origination completion assurance circuits 51, 61, 71 and 81 have incremented their origination count registers 103 every time the processors 1 to 4 issue a store request, the origination count registers 103 have already held the incremented values by counting the store requests issued before the barrier synchronization instructions, and therefore the registers 103 get decremented every time they receive from the cancel completion notification circuits 93 to 96 of the FAA 9 a cache cancel issuance completion notification corresponding to the issued store request. When the origination count registers 103 are reset to "0," which means that all the cache cancel requests corresponding to the issued store requests have been issued, the circuits 51, 61, 71 and 81 cause their zero determination circuits 115 to determine this state. When the origination completion assurance circuits 51, 61, 71 and 81 of the SCs 1 to 4 receive barrier synchronization notifications and determine that all the cache cancel requests have been issued through their origination completion circuits 106, the circuits 51, 61, 71 and 81 send origination completion notification signals to the open drain path 55 that extends over the SCs. The open drain path 55 turns on upon reception of the origination completion notification signals from all the SCs 5 to 8, and notifies the reception completion assurance circuits 52, 62, 72 and 82 of the SCs 5 to 8 to that effect to cause the circuits 52, 62, 72 and 82 to set their origination completion registers 110 shown in FIG. 5. Since the reception completion assurance circuits 52, 62, 72 and 82 have incremented their reception count registers 113 every time the cancel issuance circuit 92 of the FAA 9 issues a cache cancel request to the SCs 5 to 8, the reception count registers 113 have already been incremented when the origination completion registers 110 are set. Therefore, after the registers 110 are set, the reception count registers 113 get decremented every time the received cancel request is sent to the corresponding processors 1 to 4. When the reception count registers 113 are reset to "0,' which means that all the cache cancel requests have been issued to the processors, the reception completion assurance circuits 52, 62, 72 and 82 cause their zero determination circuits 115 to determine this state. When the circuits 52, 62, 72 and 82 receive origination completion notifications from all the SCs 5 to 8 and determine that all the cache cancel requests have been issued to all the processors 1 to 4 through their reception completion determination circuits 116, the circuits 52, 62, 72 and 82 send barrier synchronization establishment signals to the corresponding processors 1 to 4 to cause the processors 1 to 4 to set their barrier synchronization reception registers 15, 25, 35 and 45. The processors 1 to 4 start next processes through the operation of the not shown known circuits when their barrier synchronization reception registers 15, 25, 35 and 45 are set.

<Embodiment 2>

Figure 6:
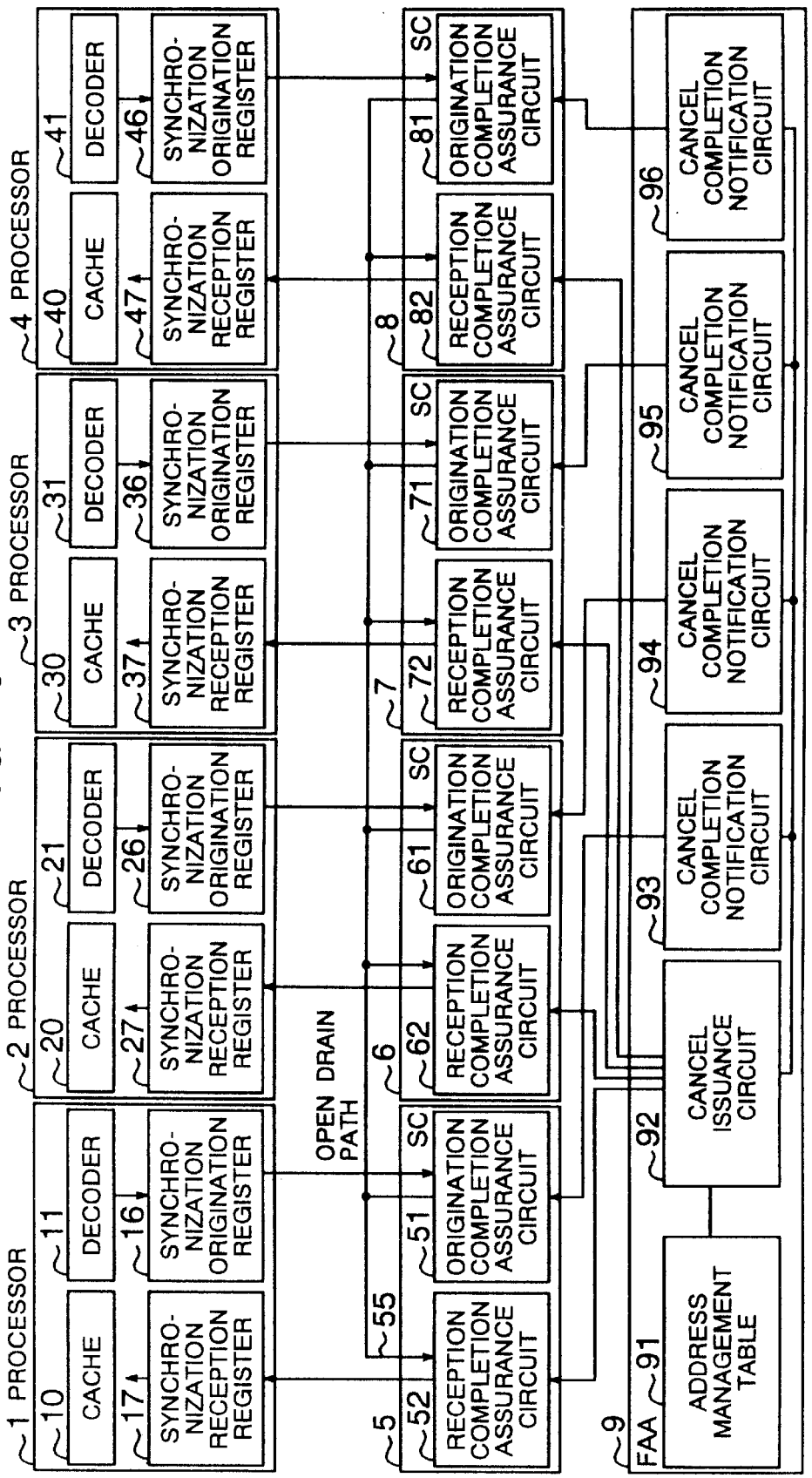
FIG. 6 is a block diagram showing an exemplary structure of a synchronization interface of the present invention that implements start, end and barrier synchronizations with a single circuit.

While the barrier synchronization operation has been described with reference to the structure shown in FIG. 3, a similar structure can perform synchronization control for the start and end operations. Such a synchronization control will be described with reference to FIG. 6. FIG. 6 shows a modification that allows the structure shown in FIG. 3 to be applied to synchronization control for each of the start, end and barrier synchronization operations.

First, for the start process, in the structure shown in FIG. 1, only the main processor 1 decodes a start instruction and sets its start origination register 12. Unlike this structure, an embodiment shown in FIG. 6 requires start instructions to be inserted into the programs of the four processors 1 to 4 so that the processors 1 to 4 set synchronization origination registers 16, 26, 36 and 46 upon decoding of the start instructions. After the registers 16, 26, 36 and 46 have been set, a process similar to the barrier synchronization control described with reference to FIG. 3 is performed. That is, when synchronization reception registers 17, 27, 37 and 47 of the processors 1 to 4 are set, the processors 1 to 4 start processing, judging that they have been activated.

Then, for the end process, in the structure shown in FIG. 2, only the subprocessors 2 to 4 decode end instructions and set their end origination registers 23, 33 and 43. Unlike this structure, the embodiment shown in FIG. 6 requires an end instruction to be inserted also into the program of the main processor 1 so that the processor 1 sets its synchronization origination register 16 upon decoding of the end instruction. When having decoded the end instructions in this way, the processors 1 to 4 set their synchronization origination registers 16, 26, 36 and 46. After the registers 16, 26, 36 and 46 have been set, a process similar to the barrier synchronization control described with reference to FIG. 3 is performed. That is, when the synchronization reception registers 17, 27, 37 and 47 of the processors 1 to 4 are set, the processors 1 to 4 start subsequent processes, judging that their processes have ended.

<Embodiment 3>

For a process bypassing access to data in the cache of each processor, cache-storage coherency assurance is not necessary. To achieve this process, one should add an interface for bypassing coherency assurance between the storage and the cache of each processor, so that a process without coherency assurance can be started quickly and thus process efficiency can be improved.

Figure 7:
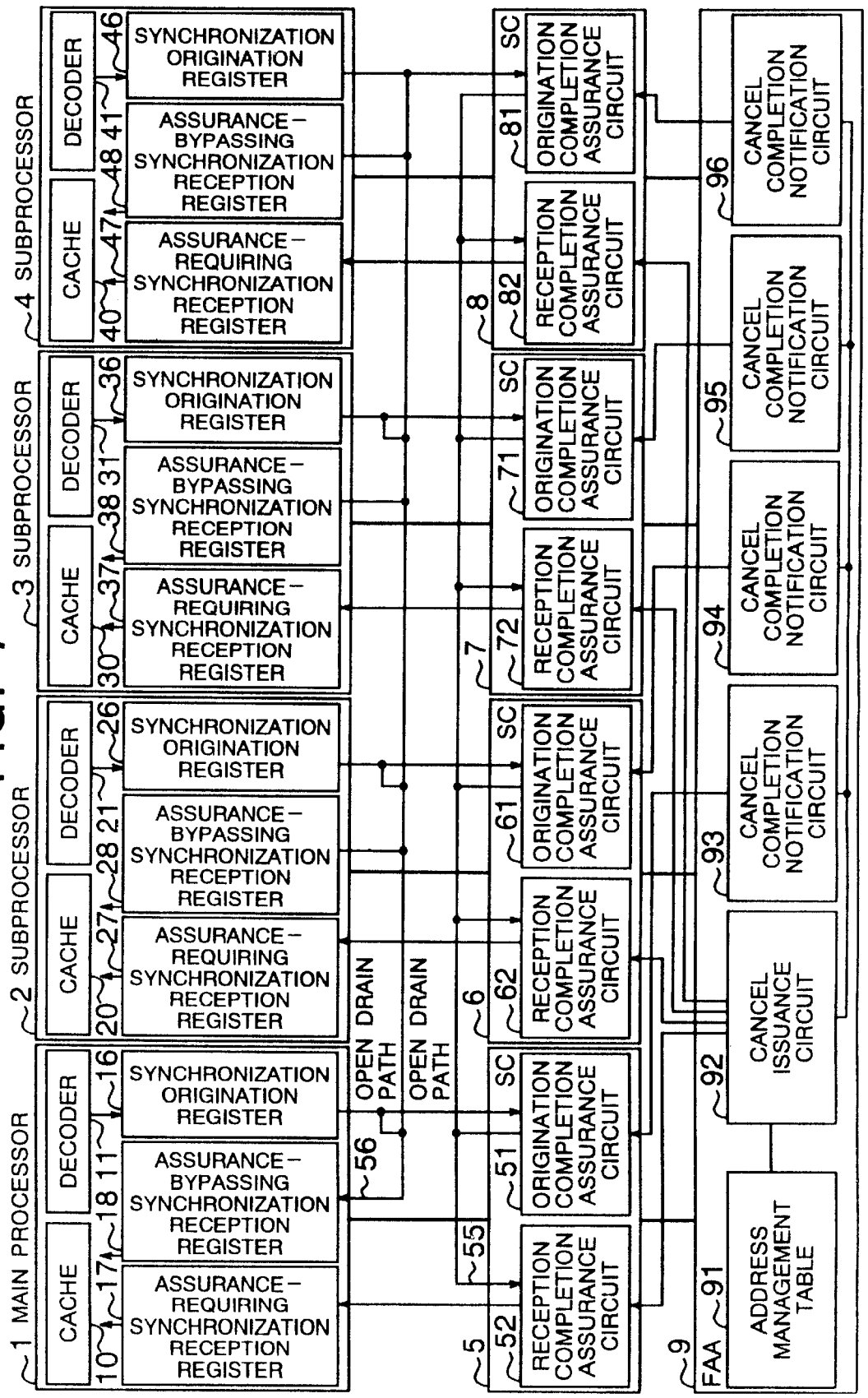
FIG. 7 is a diagram showing an exemplary structure of the present invention in which a synchronization interface including cache-storage coherency assurance and a synchronization interface not including such coherency assurance are provided.

FIG. 7 shows an exemplary structure in which the aforementioned interface is provided. Not only assurance-bypassing synchronization reception registers 18, 28, 38 and 48 are added to the structure shown in FIG. 6, but also synchronization origination registers 16, 26, 36 and 46 are connected to these assurance-bypassing synchronization reception registers 18, 28, 38 and 48 via an open drain path 56. It may be noted that assurance-requiring synchronization reception registers 17, 27, 37 and 47 have the same function as the synchronization reception registers shown in FIG. 6.

Figure 10:
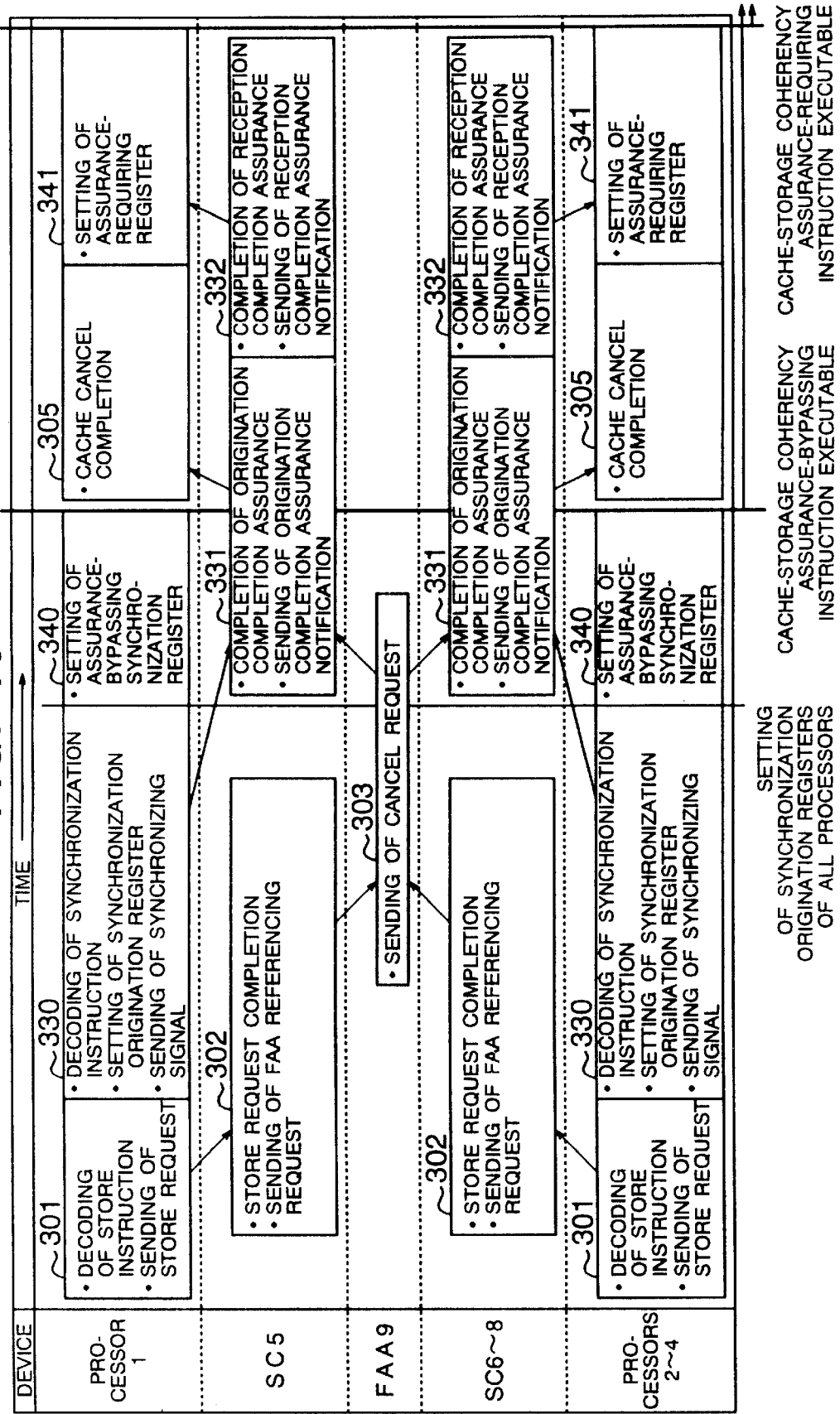
FIG. 10 is a timing chart of a synchronization process according to the invention shown in FIG. 7.

An operation of the embodiment shown in FIG. 7 will be described below on the basis of the timing chart shown in FIG. 10. Although attention is paid in FIG. 10 to a synchronization instruction (start, end, or barrier synchronization instruction) of the processor 1 for comparison with the timing chart shown in FIG. 9, the same applies to synchronization instructions of the processors 2 to 4.

First, when the processors 1 to 4 decode synchronization instructions (start, end or barrier synchronization instruction) and set their synchronization origination registers 16, 26, 36 and 46, the output signals of these registers 16, 26, 36 and 46 are sent not only to SCs 5 to 8 (Step 330) but also to the open drain path 56. The open drain path 56 turns on when all the synchronization origination registers 16, 26, 36 and 46 have been set, and notifies the processors 1 to 4 of synchronization without coherency assurance between the storage and the caches 10 to 40 to cause the processors 1 to 4 to set their assurance-bypassing synchronization reception registers 18, 28, 38 and 48 (Step 340). When the assurance-bypassing synchronization reception registers 18, 28, 38 and 48 have been set, the processors 1 to 4 start the process bypassing coherency assurance between the caches 10 to 40 and the storage.

When an instruction for a process requiring coherency assurance is fed to the circuit shown in FIG. 7, each of the processors 1 to 4 receives a synchronization notification requiring cache-storage coherency assurance,. and the assurance-requiring synchronization reception registers 17, 27, 37 and 47 are set (Step 341) to start the coherency assurance-requiring process.

While the example where the interface bypassing cache-storage coherency assurance is added to the structure shown in FIG. 6 has been presented in FIG. 7, such an interface that bypasses cache-storage coherency assurance may similarly be added to the circuit for each of the start, end and barrier synchronization interfaces shown in FIGS. 1 to 3.

<Embodiment 4>

In general, a compiler equally inserts, during the compiling of a plurality of programs to be allocated to a plurality of processors, a barrier synchronization instruction into each of the programs unless it can determine the absence of an overlap between a storage access address based on an instruction before a predetermined timing and a storage access address based on a subsequent instruction. The barrier synchronization instruction assures completion of cache-storage coherency assurance control (cache coherency control). Even if a barrier synchronization instruction that assures cache coherency control completion is inserted because the absence of data dependence between instructions cannot be determined during compiling, the presence of data dependence may, in some cases, be determined during the execution of the programs. There is an example of a DO loop in which the size of an array is defined during execution. Thus, if barrier synchronization control that assures cache coherency control completion is executed regularly even for the case where the absence of data dependence can be determined dynamically, wait time that is otherwise unnecessary is increased, which hence prevents high-speed processing.

This embodiment is to implement high-speed parallel processing by establishing a barrier synchronization without considering cache coherency control completion and thus by reducing unnecessary wait time in the case where the absence of data dependence can be determined dynamically.

Figure 8:
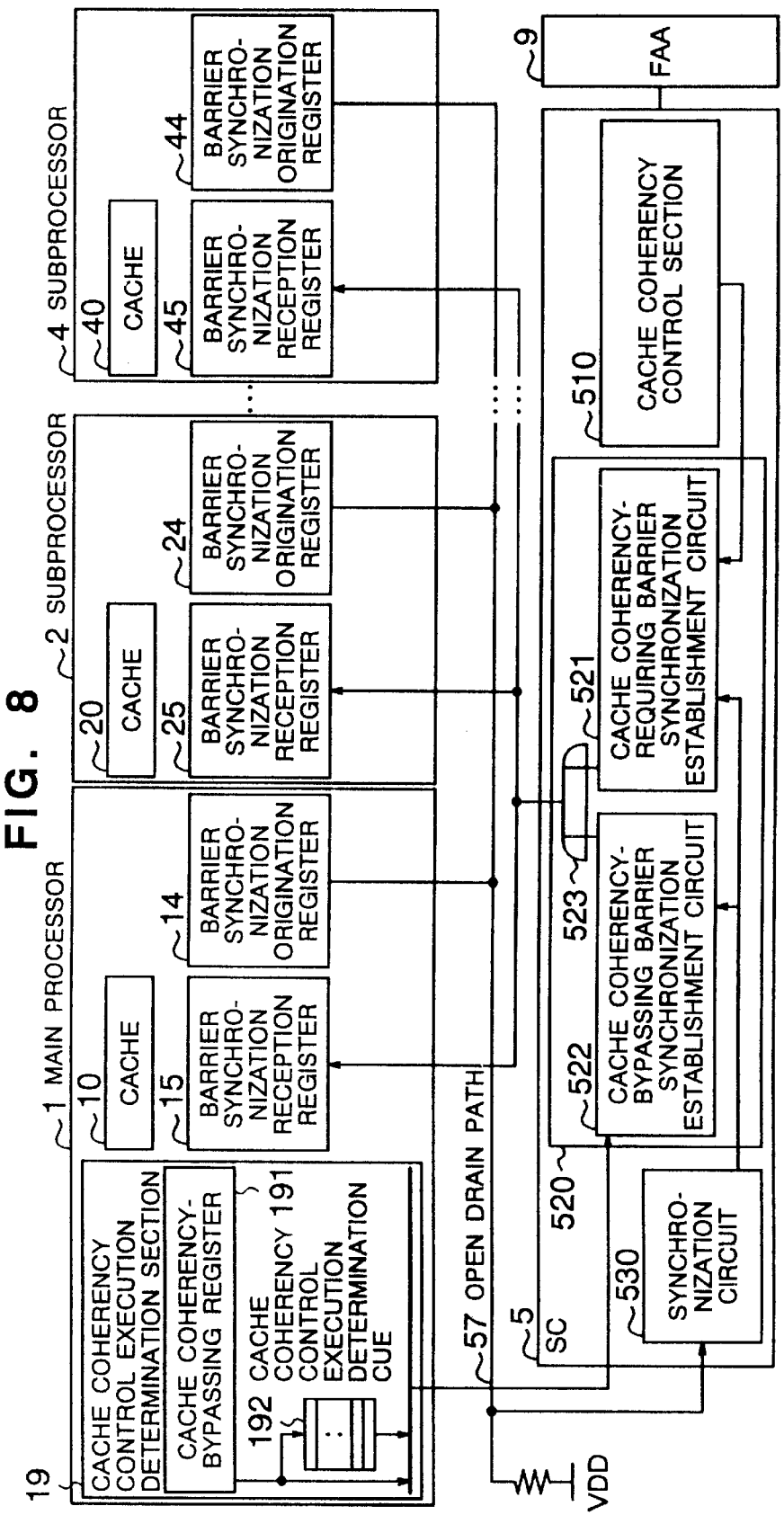
FIG. 8 is a diagram showing an exemplary structure of the present invention in which barrier synchronization control is effected by detecting a case where the absence of data dependence can be dynamically determined.

A structural schematic of this embodiment is shown in FIG. 8. A plurality of processors 1 to 4, each having a cache, are connected so that they can access a commonly shared storage (not shown) through a storage controller (SC) 5. A front address array or an address management table controller (FAA) 9 provides a centralized management of storage address information for the data held in caches 10 to 40 of all the processors 1 to 4. The SC 5 may be provided for each of the processors as in the aforementioned embodiments.

The processors 1 to 4 have barrier synchronization origination registers 14, 24, 34 and 44 and barrier synchronization reception registers 15, 25, 35 and 45 in a manner similar to those of FIG. 3. In this embodiment, the main processor 1 mainly executes a process that is not parallelly executable, while the subprocessors 2 to 4 undertake parallelly-executable processes that are allocated to them by the main processor 1. The main processor 1 has a cache coherency control execution determination section 19. The cache coherency control execution determination section 19 includes a cache coherency control execution determination cue 192 in addition to a cache coherency-bypassing register 191, so that values to be set to the register 191 can be prepared and cued in advance to save the time for setting such values to the register 191. The SC 5 comprises a cache coherency control section 510, a barrier synchronization establishment control section 520 and a synchronization circuit 530. The section 520 includes a cache coherency-requiring barrier synchronization establishment circuit 521, a cache coherency-bypassing barrier synchronization establishment circuit 522, and an OR circuit 523. The synchronization circuit 530 synchronizes barrier-synchronizing signals of all the processors 1 to 4. The cache coherency control section 510 has basically the same function as a combined circuit of the origination completion assurance circuit and the reception completion assurance circuit shown in FIG. 3. An open drain path 57 turns on when all the barrier synchronization origination registers 14, 24, 34 and 44 of the processors 1 to 4 have been set, and sends barrier-synchronizing signals to the SC 5.

First, a barrier synchronization operation to be performed in this embodiment for executing a program including two DO loops such as shown in FIG. 11 will be described.

The two DO loops shown in FIG. 11 are adjacent to each other, and both access an array A. The program defines at the time of its execution that the array A(i) to be accessed by a loop DO 10 range from J to K and that the array A(i) to be accessed by a loop DO 20 range from L to M, and whether an overlap exists between the array A(i) to be accessed by the DO 10 and the array A(i) to be accessed by the DO 20 can be dynamically determined, i.e., during the execution of the program. For example, a routine that determines the absence of an overlap if J>M or L>K can be prepared.

Figure 12:
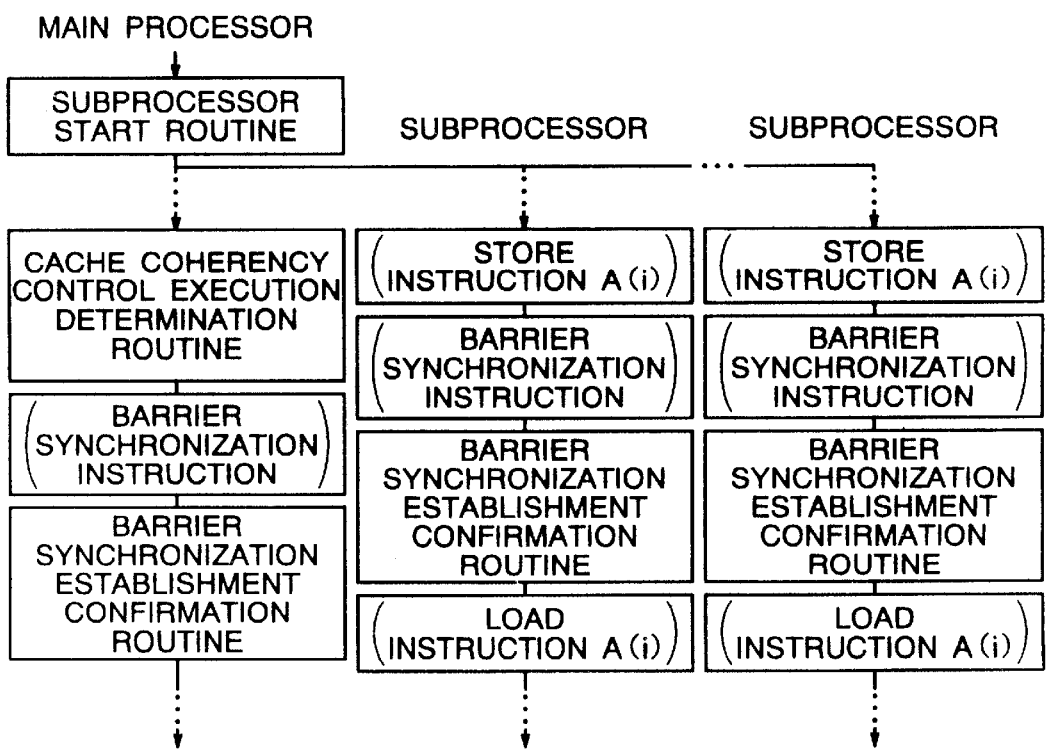
FIG. 12 is a diagram describing the execution steps of the instruction array of FIG. 11 on a processor basis.

An outline of arrays of barrier synchronization-related instructions that are executed by the processors 1, 2 and 4 is shown in FIG. 12. The main processor 1 executes the instructions in the order of a cache coherency control execution determination routine, a barrier synchronization instruction and a barrier synchronization establishment confirmation routine, while each of the processors 2 and 4 executes the instructions in the order of a store instruction A(i), a barrier synchronization instruction, a barrier synchronization establishment confirmation routine and a load instruction A(i).

The cache coherency-bypassing register 191 within the main processor 1 is initially set to "0." When the cache coherency control execution determination routine determines that the control should be executed, the register 191 is set to "0," while when the same routine determines negatively, the register 191 is set to "1." When the subprocessors 2 and 4 issue store instructions, the FAA 9 issues cache cancel requests, and upon confirmation of a cache cancel process end, the FAA 9 issues a cache cancel process completion notification. When all the processors 1, 2 and 4 have executed barrier synchronization instructions, their barrier synchronization origination registers 14, 24 and 44 are all set to "1." As a result, the open drain path 57 turns on, and the value "1" is sent to the barrier synchronization establishment control section 520 through the synchronization circuit 530 of the SC 5. The output of the cache coherency-bypassing register 191 is fed to the SC 5 directly when the buffering cue 192 gets empty.

If cache coherency control is required, the output signal of the cache coherency control execution determination section 19 is reset to "0." At this time, the cache coherency-bypassing barrier synchronization establishment circuit 522 does not function, but only the cache coherency-requiring barrier synchronization establishment circuit 521 functions. The cache coherency-requiring synchronization establishment circuit 521 sends all the processors 1, 2 and 4 barrier synchronization establishment signals through the OR circuit 523 when the output of the synchronization circuit 530 is set to "1" and upon reception of a cache cancel process end notification from the cache coherency control section 510. The processors 1, 2 and 4 set their barrier synchronization reception registers 15, 25 and 45 to "1" upon reception of the barrier synchronization establishment signals, and reset their barrier synchronization origination registers 14, 24 and 44 to "0" simultaneously.

On the other hand, if cache coherency control is not required, the output signal of the cache coherency control execution determination section 19 is set to "1." In this case, the cache coherency-bypassing barrier synchronization establishment circuit 522 functions, and immediately sends all the processors 1, 2 and 4 barrier synchronization establishment signals through the OR circuit 523 when the output of the synchronization circuit 530 is set to "1," which indicates that a barrier synchronization has been established for all the processors 1, 2 and 4. As a result, the processors 1, 2 and 4 set their barrier synchronization reception registers 15, 25 and 45 to "1," and reset their barrier synchronization origination registers 14, 24 and 44 to "0" simultaneously. Further, the main processor 1 resets its cache coherency-bypassing register 191 to "0."

Then, a barrier synchronization operation to be performed in this embodiment for executing a program including four DO loops such as shown in FIG. 13 will be described.

A program shown in FIG. 13 includes four adjacent DO loops. The program defines at the time of its execution that the array A(i) to be accessed by a loop DO 30 range from J to K and that the array A(i) to be accessed by a loop DO 40 range from L0 to M0, and whether an overlap exists between the array A(i) to be accessed by the DO 30 and the array A(i) to be accessed by the DO 40 can be dynamically determined. Similarly, with respect to the arrays B(i) to be accessed by the DO 40 and a DO 50 and the arrays C(i) to be accessed by the DO 50 and a DO 60, their access ranges are defined at the time of the execution of the program, and whether there is an overlap between such access ranges can be determined dynamically, i.e., during the execution of the program.

Figure 14:
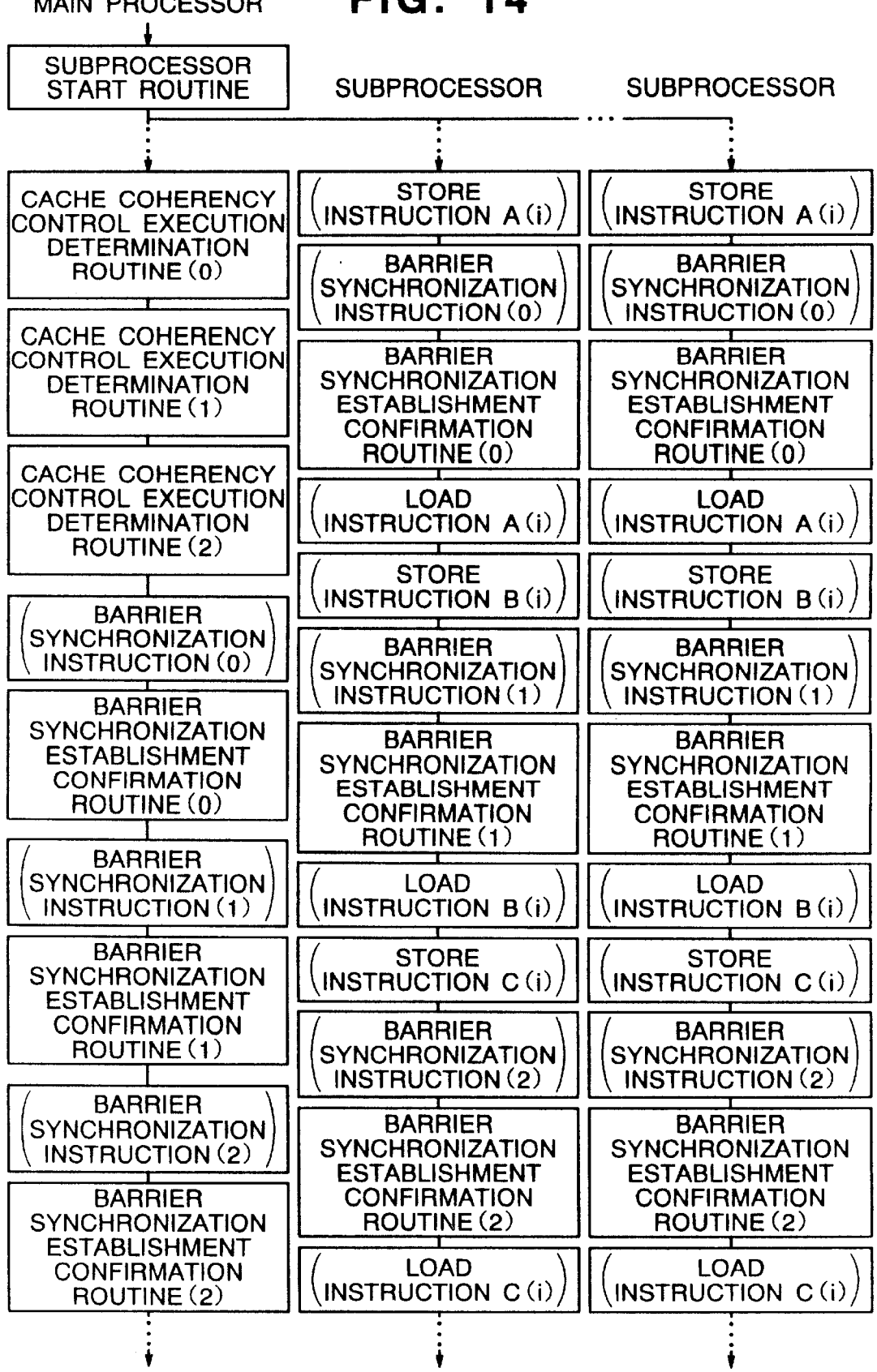
FIG. 14 is a diagram describing the execution steps of the instruction array of FIG. 13 on a processor basis.

Arrays of barrier synchronization-related instructions to be executed by the processors 1, 2 and 4 are shown in FIG. 14. The main processor 1 executes the instructions in the order of cache coherency control execution determination routines (0) to (2), a barrier synchronization instruction (0), a barrier synchronization establishment confirmation routine (0), a barrier synchronization instruction (1), a barrier synchronization establishment confirmation routine (1), a barrier synchronization instruction (2) and a barrier synchronization establishment confirmation routine (2). Each of the subprocessors 2 and 4 executes the instructions in the order of a store instruction A(i), a barrier synchronization instruction (0), a barrier synchronization establishment confirmation routine (0), a load instruction A(i), a store instruction B(i), a barrier synchronization instruction (1), a barrier synchronization establishment confirmation routine (1), a load instruction B(i), a store instruction C(i), a barrier synchronization instruction (2), a barrier synchronization establishment confirmation routine (2) and a load instruction C(i).

The cache coherency control execution determination routine is executed in the order of a determination operation (0), a determination operation (1), and a determination operation (2). The results are sequentially cued into the cache coherency control execution determination cue 192 by the cache coherency control execution determination section 19 through the cache coherency-bypassing register 191.

During the execution of the barrier synchronization instructions (0) to (2), information about whether cache coherency control is required or not is sent to the barrier synchronization establishment control section 520 by sequentially using the cache coherency control execution determination values cued in the cache coherency control execution determination cue 192. This information causes the barrier synchronization establishment control section 520 to effect barrier synchronization establishment control with or without cache coherency control in a manner similar to the example shown in FIG. 11. The main processor 1 sequentially resets the contents of the cache coherency control execution determination cue 192 to "0" every time a barrier synchronization is established and thus every time a value in the cue is used.

If the barrier synchronization operation is to be performed without cache coherency control execution determination in this embodiment, the output of the cache coherency control execution determination section 19 can be fixed to a value indicating that cache coherency control is required, so that a barrier synchronization operation assuring cache coherency control completion can be performed without fail.

Embodiment 4 can be combined with Embodiment 3. That is, each of the processors starts a process bypassing cache-storage coherency assurance through the application of Embodiment 3, and then each processor determines whether cache-storage coherency assurance is required or not dynamically through the application of Embodiment 4 and executes as determined.

What is claimed is:

1. An apparatus for controlling parallel processors comprising:

a storage;

a plurality of processors respectively having caches and commonly sharing the storage; and a plurality of storage controllers each connected between said storage and a respective one of the plurality of processors, wherein one of the plurality of processors has a start circuit for sending a start signal to one storage controller of said plurality of storage controllers that is connected to the one processor when the one processor has executed a start instruction to the rest of the processors;

the one storage controller connected to the one processor has a first assurance circuit for detecting completion of sending of cache data cancel signals corresponding to a storage instruction that was issued by the one processor before the start instruction and for notifying the storage controllers connected to the rest of the processors of the detection; and the other storage controllers connected respectively to the rest of the processors have second assurance circuits for sending start instructions to their respective processors when the second assurance circuits detect completion of the issuing of cache cancel requests to the rest of the processors in response to the notification from the one storage controller connected to the one processor.

2. An apparatus according to claim 1, further comprising:

an address management table for holding storage address information for data held in the caches; and a cancel issuance circuit, connected to the first assurance circuit and the second assurance circuits, for issuing said cache data cancel signals corresponding to a store instruction issued by the one processor by referencing the address management table.

3. An apparatus according to claim 1, wherein the rest of the processors stop processing of instructions after the start instruction until the rest of the processors receive the start instructions.

4. An apparatus according to claim 3, wherein the rest of the processors have end origination circuits for sending end signals to their respective storage controllers connected to the rest of the processors when the rest of the processors have executed end instructions each indicating that a process has ended; and the storage controllers connected to the rest of the processors have circuits for detecting completion of the sending to the one processor of cache data cancel signals corresponding to a store instruction issued before the end instructions.

5. An apparatus according to claim 3, wherein the one processor has a coherency determination section for detecting a process that bypasses determination of coherency between storage data and cache data, and a synchronization reception circuit, connected to the coherency determination section, for receiving signals each indicating establishment of a synchronization among instructions from all the plurality of processors.

6. A method of controlling an apparatus for controlling parallel processors, comprising:

a start step in which, when one of a plurality of processors has executed a start instruction for the rest of the processors, the one processor sends a start signal to one storage controller of a plurality of storage controllers, the one storage controller being connected to the one processor;

a step in which the one storage controller connected to the one processor detects completion of the sending of cache data cancel signals corresponding to a store instruction that was issued by the one processor before the start instruction and notifies the storage controllers connected to the rest of the processors of the detection; and a step in which the other storage controllers respectively connected to the rest of the processors send start instructions to their respective processors when the storage controllers have detected completion of the issuing of cache cancel requests to the rest of the processors in response to the notification from the one storage controller connected to the one processor.

7. A method according to claim 6, further comprising a cancel issuance step for issuing cache cancel signals corresponding to a store instruction issued by the one processor by referencing an address management table.

8. A method according to claim 7, wherein the rest of the processors stop processing of instructions after the start instruction until the rest of the processors receive the start instructions.

9. A method according to claim 8, further comprising:

an end issuance step in which the rest of the processors send their respective storage controllers connected thereto end signals when the rest of the processors have executed end instructions each indicating that a process has ended; and a step in which the storage controllers connected to the rest of the processors detect completion of the sending to the one processor of cache data cancel signals corresponding to a store instruction issued before the end instructions.

10. A method according to claim 9, further comprising:

a step in which the one processor detects a process that bypasses determination of coherency between storage data and cache data; and a synchronization reception step in which signals, each indicating establishment of a synchronization among instructions, are received from all the plurality of processors.

11. A parallel processor system comprising:

a plurality of processors respectively having caches;

a plurality of storage controllers (SC) respectively connected to the plurality of processors;

a storage shared in common by the plurality of processors;

an address management table controller (FAA) for providing a centralized management of storage address information for data held in the caches of all the processors;

a circuit, provided in each processor that issues a synchronization instruction, for sending a synchronizing signal to an SC connected to the processor;

a circuit for causing each SC having received the synchronizing signal to detect completion of an FAA check and of the issuing of a necessary cache cancel request corresponding to a store instruction that was issued before the synchronization instruction;

a circuit for, when all the SCs have detected completion of the FAA check and of the issuing of the necessary cache cancel request corresponding to the store instruction, notifying each SC of the detection; and a circuit for notifying a processor connected to each SC of establishment of a synchronization when each SC has recognized that all the SCs have completed the FAA check and the issuing of the cache cancel requests and when each SC has issued accepted cache cancel requests to their respective processor.

12. A system according to claim 11, wherein all the processors have circuits for detecting the sending of synchronizing signals to the SCs connected to all the processors and for notifying all the processors of establishment of a synchronization, and effect synchronization control with and without cache-storage coherency assurance.

13. A parallel processor system having a plurality of processors respectively having caches, a storage shared in common by the plurality of processors, and a storage controller (SC) having a cache coherency control circuit for effecting cache-storage coherency assurance control corresponding to a store instruction, comprising:

a cache coherency control execution determination section, provided within at least one processor, for determining whether or not completion of cache coherency control corresponding to a store instruction issued before a barrier synchronization instruction is related to establishment of a barrier synchronization and for holding the determined result;

a circuit for causing each processor to send a barrier-synchronizing signal when each processor has executed the barrier synchronization instruction;

a circuit for, when the cache coherency control execution determination section has determined that cache coherency control is required, notifying each processor of establishment of a barrier synchronization upon confirmation of the fact that all the processors have sent the barrier-synchronizing signals and that cache coherency control corresponding to the store instruction issued before the barrier synchronization instruction has been completed; and a circuit for, when the cache coherency control execution determination section has determined that cache coherency control is not required, notifying each processor of establishment of a barrier synchronization upon confirmation of the fact that all the processors have sent the barrier-synchronizing signals.

14. A system according to claim 13, wherein the cache coherency control execution determination section has a cache coherency control execution determination cue for holding determined results corresponding to a plurality of barrier synchronization instructions, holds, in the cache coherency control execution determination cue, the determined results obtained from cache coherency control execution determinations corresponding to the plurality of barrier synchronization instructions made in advance, and effects barrier synchronization control using the determined results held in the cache coherency control execution determination cue during execution of the barrier synchronization instructions.

15. A system according to claim 14, wherein barrier synchronization control that assures completion of cache coherency control can be effected without fail by fixing an output of the cache coherency control execution determination section to a value indicating that cache coherency control is required.

16. A parallel processor system having a plurality of processors respectively having caches, a plurality of storage controllers (SC) respectively connected to the plurality of processors, a storage shared in common by the plurality of processors, and an address management table controller (FAA) for providing a centralized management of storage address information for data held in the caches of all the processors, comprising:

a circuit for causing a main processor to send a start signal to an SC connected to a main processor when the main processor has executed an instruction (start instruction) for starting other processors of said plurality of processors;

a circuit for causing the SC connected to the main processor and having received the start signal to detect completion of an FAA check and of the issuing of a necessary cache cancel request corresponding to a store instruction that was issued before the start instruction, and to notify an SC connected to each processor of the detection; and a circuit for causing the SC connected to each processor and having received the notification to start the processor connected to the SC when the SC has detected the issuing to the processor of all the cache cancel requests issued from the main processor to the processor before the start instruction, wherein start synchronization control including cache-storage coherency assurance is effected between the main processor and each of the processors.

17. A parallel processor system having a plurality of processors respectively having caches, a plurality of storage controllers (SC) respectively connected to the plurality of processors, a storage shared in common by the plurality of processors, and an address management table controller (FAA) for providing a centralized management of storage address information for data held in the caches of all the processors, comprising:

a circuit for causing each subprocessor to send an end signal to an SC connected to each subprocessor when each subprocessor has executed an instruction (end instruction) indicating that an internal process has ended;

a circuit for causing the SC connected to each subprocessor having received the end signal to detect completion of an FAA check and of the issuing of a necessary cache cancel request corresponding to a store instruction that was issued before the end instruction;

a circuit for, when the SCs connected to all the subprocessors have detected completion of the FAA check and of the issuing of the necessary cache cancel request corresponding to the store instruction, notifying an SC connected to the main processor of the detection; and a circuit for notifying the main processor of an end when the SC connected to the main processor having received the notification has detected the issuing to the main processor of all the cache cancel requests issued from each subprocessor to the main processor before the end instruction, wherein end synchronization control including cache-storage coherency assurance is effected between the main processor and each of the subprocessors.

18. A parallel processor system having a plurality of processors respectively having caches, a plurality of storage controllers (SC) respectively connected to the plurality of processors, a storage shared in common by the plurality of processors, and an address management table controller (FAA) for providing a centralized management of storage address information for data held in the caches of all the processors, comprising:

a circuit for causing each processor to send a barrier-synchronizing signal to an SC connected to each respective processor when each respective processor has executed an instruction (barrier synchronization instruction) for synchronizing all the processors to assure sequencing according to which all the processors access the same address of the storage;

a circuit for causing each SC having received the barrier-synchronizing signal to detect completion of an FAA check and of the issuing of a necessary cache cancel request corresponding to a store instruction that was issued before the barrier synchronization instruction;

a circuit for, when all the SCs have detected completion of the FAA check and of the issuing of the necessary cache cancel request corresponding to the store instruction, notifying each SC of the detection; and a circuit for notifying a processor connected to each SC having received the notification of establishment of a barrier synchronization when each SC has recognized that all the SCs completed the FAA check and the issuing of the cache cancel requests and when each SC has issued all the accepted cache cancel requests to the processor, wherein barrier synchronization control coincidence assurance is effected.

* * * * *